(12) United States Patent
Wiscombe et al.

(10) Patent No.: US 9,370,071 B2
(45) Date of Patent: Jun. 14, 2016

(54) LIGHTING DEVICE

(71) Applicant: iLight, LLC, Kaysville, UT (US)

(72) Inventors: Joshua James Wiscombe, Layton, UT (US); Gary Bret Millar, Highland, UT (US)

(73) Assignee: iLight, LLC, Kaysville, UT (US)

( * ) Notice: Subject to any disclaimer, the term of this patent is extended or adjusted under 35 U.S.C. 154(b) by 0 days.

(21) Appl. No.: 14/530,198

(22) Filed: Oct. 31, 2014

(65) Prior Publication Data

US 2015/0156840 A1    Jun. 4, 2015

Related U.S. Application Data

(60) Provisional application No. 61/898,248, filed on Oct. 31, 2013.

(51) Int. Cl.
*H05B 37/02* (2006.01)
*H05B 39/04* (2006.01)
*H05B 41/36* (2006.01)
*H05B 33/08* (2006.01)

(52) U.S. Cl.
CPC ........ *H05B 33/0854* (2013.01); *H05B 33/0887* (2013.01); *H05B 37/0218* (2013.01); *Y02B 20/348* (2013.01); *Y02B 20/46* (2013.01)

(58) Field of Classification Search
None
See application file for complete search history.

(56) References Cited

U.S. PATENT DOCUMENTS

| | | | |
|---|---|---|---|
| 6,227,679 B1 * | 5/2001 | Zhang et al. | 362/236 |
| 7,352,138 B2 * | 4/2008 | Lys et al. | 315/291 |
| 2004/0114367 A1 * | 6/2004 | Li | 362/248 |
| 2011/0186874 A1 * | 8/2011 | Shum | 257/88 |
| 2012/0218748 A1 * | 8/2012 | Conrad | 362/230 |

* cited by examiner

*Primary Examiner* — Anh Tran
(74) *Attorney, Agent, or Firm* — Thorpe North & Western LLP

(57) ABSTRACT

A light bulb assembly is described. The light bulb assembly includes a bridge rectifier to perform full wave rectification of an alternating current (AC) power source, a capacitor to smooth a voltage from the bridge rectifier, and a plurality of light emitting diodes (LEDs) arranged in series. A number of LEDs included in the light bulb assembly is selected by substantially balancing the voltage from the AC power source with a predefined voltage drop associated with each of the LEDs to consume the voltage entirely using the LEDs to generate light.

17 Claims, 6 Drawing Sheets

LIGHTING DEVICE

PRIORITY DATA

This application claims the benefit of U.S. Provisional Patent Application Ser. No. 61/898,248, filed on Oct. 31, 2013, which is incorporated herein by reference.

BACKGROUND

Indoor and outdoor lighting may be used for a variety of purposes. For example, decorative lighting may be popular during the holiday season and other times of the year. The decorative lighting may include a string of multiple lights. In addition, the decorative lighting may flash, dim, brighten, and blink according to a predefined setting. Lighting may also be used in the workplace or at home to provide light needed for activities at work or home.

As another example, the lighting may be included as part of a home automation system. For example, the home automation system may allow the indoor lighting to be controlled remotely. The lighting scheme (e.g., brightness, time of day when the lights are turned on and off) may be customized to save electricity and increase the lifetime of the light bulbs.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION

Figure 1:
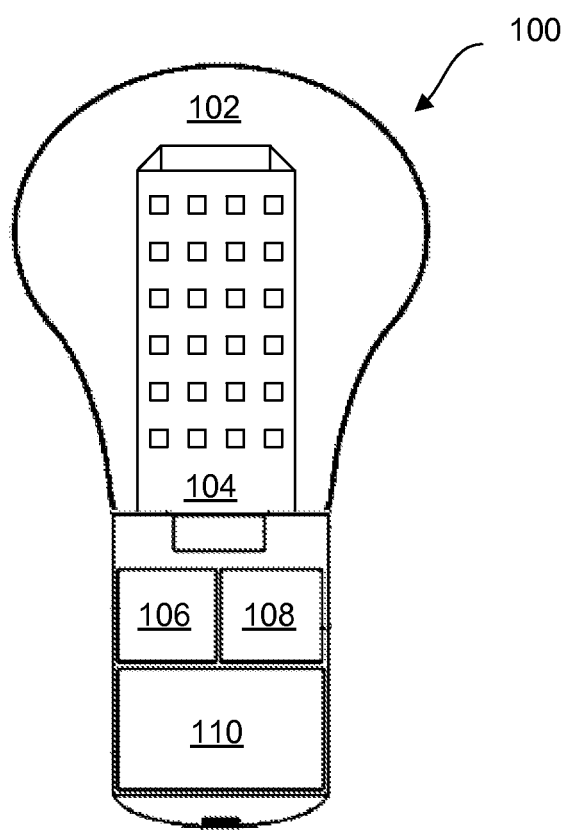
FIG. 1 is an illustration of a light emitting diode (LED) bulb according to an example of the present technology.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A light bulb assembly including a bridge rectifier, a capacitor, and a plurality of light emitting diodes (LEDs) arranged in series is described. The bridge rectifier may perform full wave rectification of an alternating current (AC) power source. The capacitor may smooth a voltage from the bridge rectifier. A number of LEDs included in the light bulb assembly may be selected by substantially balancing the voltage from the AC power source with a predefined voltage drop associated with each of the LEDs to consume the voltage entirely using the LEDs to generate light. In other words, a total voltage drop associated with the plurality of LEDs may be substantially equal to the voltage from the AC power source.

In one configuration, the predefined voltage drop associated with each of the LEDs may be approximately 1-6 volts per LED. In one example, the predefined voltage drop associated with the LEDs may be up to approximately 45 V. As a non-limiting example, the voltage drop associated with approximately 50 LEDs may be substantially balanced with approximately 120 volts provided by the AC power source. In addition, the number of LEDs included in the light bulb assembly may be selected based on a desired amount of lumens for the LEDs (e.g., 800 lumens or 450 lumens) and a voltage drop substantially equal to the supplied AC voltage.

In one configuration, the plurality of LEDs may generate a defined amount of lumens substantially matching a luminosity level associated with 40 watt (W), 60 W, or 100 W incandescent light bulbs. For example, the plurality of LEDs may generate approximately 800 lumens to match the luminosity level of the 60 W incandescent light bulb, approximately 450 lumens to match the luminosity level of the 40 W incandescent light bulb, or approximately 1600 lumens to match the luminosity level of the 100 W incandescent light bulb. The light bulb assembly may include approximately 40-100 LEDs. In one configuration, the light bulb assembly may approximately include as few as 20 LEDs or as many as 150 LEDs. In addition, the LEDs may be white LEDs, red LEDs, green LEDs, or blue LEDs. The LEDs may be arranged on a cylindrical panel within the light bulb assembly. Alternatively, the LEDs may be arranged on two or more panels that form a geometric shape within the light bulb assembly. For example, the panels may form a rectangular shape. The LEDs may be arranged in a two-dimensional array on each of the panels within the light bulb assembly.

In one example, the light bulb assembly may be configured to fit in a light bulb size envelope and socket size. This means that the light bulb assembly may be able to fit within a defined light bulb form factor. For example, the light bulb may be a form factor that fits with any of the Edison screw connector sizes (E5, E10, E11, E12, E14, E17, E26, E29, E31, E39, E40). A specific desirable form factor is the A-series light bulb that is the light bulb size that has been the most commonly used type for general-purpose lighting applications since the early 20th century. This form factor has a pear-like shape and an Edison screw base. The number that follows the "A" within the A series indicates the width of the bulb in one-eighth inch units. The most commonly used A-series light bulb type is the A19 bulb, which is 2⅜ inches wide at its widest point, approximately 4⅜ inches in length, and has a one-inch wide (type E26, i.e. approximately 26 millimeters wide) Edison screw base. The A-series light bulbs may also include the A18 and A21 light bulbs.

The light bulb assembly may include a varistor in series with the bridge rectifier to protect the plurality of LEDs from excess current. In addition, the light bulb assembly may include a microprocessor to dim the plurality of LEDs using a triode for alternating current (TRIAC) in series with the bridge rectifier. As another example, the microprocessor may control the TRIAC in order to adjust a number of lumens produced by the plurality of LEDs based on an amount of light detected by an ambient light sensor. In addition, the bridge rectifier, capacitor, LEDs, varistor, microprocessor, TRIAC, and ambient light sensor may be on a single printed circuit board (PCB) within the light bulb assembly.

FIG. 1 illustrates an example of a light emitting diode (LED) bulb assembly 100. The LED bulb assembly 100 may be included in the string of multiple light bulbs (e.g., decorative lights) or used as a single stand-alone light bulb. Alternatively, the LED bulb assembly 100 may be included in a home, office building, factory, etc. The LED bulb assembly 100 may have a power circuit that may be powered from an alternating current (AC) wiring outlet in the home or office building. The AC wiring outlet may supply 100/110 volts, 240 volts, etc. In one configuration, the CPU 108 or power microprocessor associated with the LED bulb assembly 100 may receive instructions over the AC wiring, such as instructions to turn off, turn on, dim, brighten, etc. In one example, the power microprocessor associated with the LED bulb assembly 100 may receive the instructions using a power line communications (PLC) protocol from a communications processor.

The LED bulb assembly 100 may include a lighting area 102 that is composed of a polycarbonate plastic with a frosted finish. The lighting area 102 may be spherical, cylindrical, triangular, cubical, conical, etc. Alternatively, the lighting area 102 may be composed of various materials, such as plastic, glass, other transparent or semi-transparent material, etc. The LED bulb assembly 100 may include a light source 104. In one example, the light source 104 may be at least one light emitting diode (LED).

In one example, the LED bulb assembly 100 may include a power line communications (PLC) module or circuit 106. The PLC 106 may allow a central processing unit (CPU) 108 or power microprocessor included in the LED bulb assembly 100 to connect to the AC wiring to receive communication signals. Alternatively, the logic for power line communications may reside within the central processing unit (CPU). In addition, the CPU 108 or power microprocessor 108 may be included on a circuit board with the LED(s) 104. The terms CPU may be used interchangeably in this discussion of FIG. 1. As a result, the LED bulb assembly 100 with the power line communication (PLC) may be employed in home applications, commercial applications, industrial applications, lighting automation systems, decorative lighting systems or any other systems that use AC electrical wiring for communication. The PLC 106 may isolate the AC power line from the control circuitry, as well as filter transit electrical noise.

As mentioned earlier, the LED bulb assembly 100 may include a central processing unit (CPU) 108. The CPU 108 may control a brightness level associated with the LED bulb assembly 100 by controlling the timing and/or amounts of power sent to the LEDs. In addition, the CPU 108 may store lighting settings and process signals received via the PLC 106. The CPU 108 may include: an oscillator to control clock timing, an input-output (I/O) port to receive signals from the PLC 106, and an Electrical Erasable Programmed Read Only Memory (EEPROM) to store lighting settings.

In one example, the EEPROM may store the lighting settings even in the absence of power. The CPU 108 may include functionality to control the pulse width modulation (PWM) of the LEDs in the light source 104. In other words, the microcontroller may control the brightness level produced at the light source 104 by controlling the duty cycle and strength of the power sent to each LED in the light source 104. The brightness may be increased or decreased based on the information communicated to the microprocessor. In addition, the microcontroller may process the signals received via the PLC 106 to enable control of the LED bulb assembly 100.

The LED bulb assembly 100 may include a power unit 110. In one example, the power unit 110 may convert the AC voltage (e.g., 110-120 AC voltage) to a voltage that is suitable to power the LED bulb assembly 100. The power unit may provide a half wave or full wave rectification that is smoothed and limited to a specific voltage range.

Figure 2:
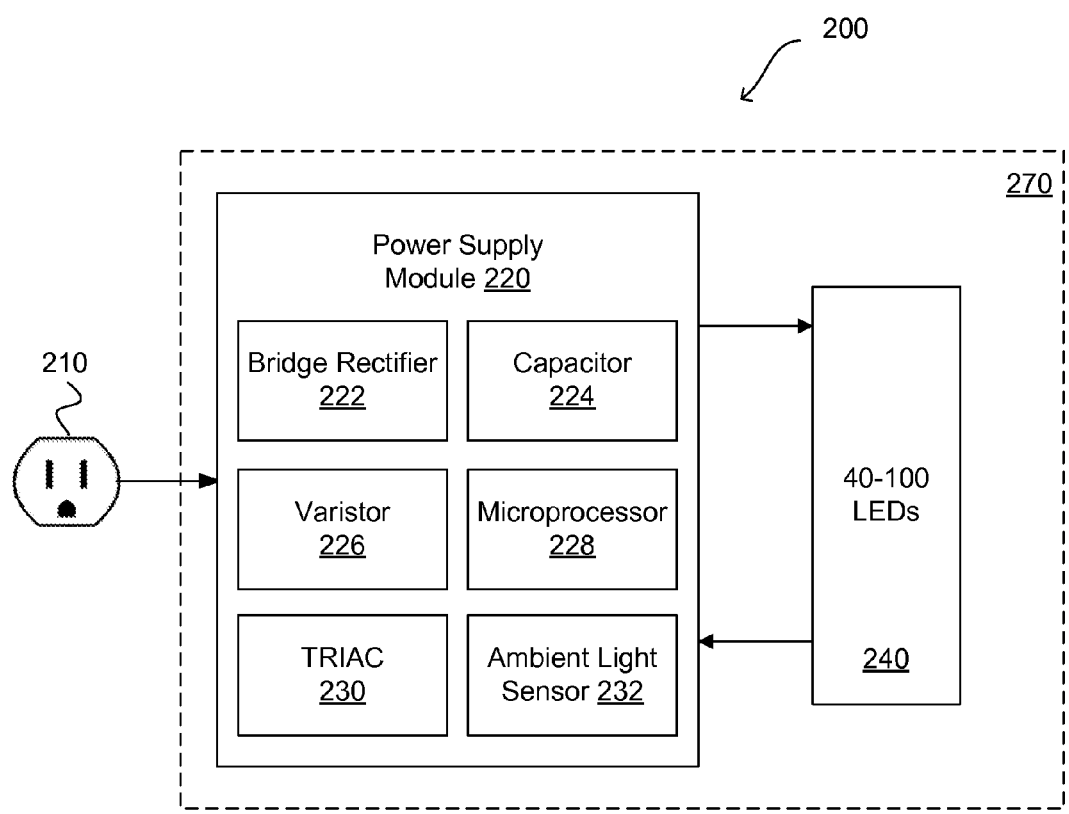
FIG. 2 is a system for powering a light emitting diode (LED) bulb using an alternating current (AC) power source according to an example of the present technology.

FIG. 2 is a system 200 for powering a light emitting diode (LED) bulb using an alternating current (AC) power source. The system 200 may include a power source 210, a power supply module 220 and a plurality of LEDs 240. The power supply module 220 and the plurality of LEDs 240 may be included within a light bulb assembly 270. Since the power supply is inside the light bulb assembly 270, the plurality of LEDs 240 may be powered by simply connecting the light bulb assembly 270 to an electrical socket or outlet via a light bulb base. In addition, the light bulb assembly 270 can be connected to the light bulb base using a screw fitting system (e.g., an Edison screw fitting system). The light bulb base may connect to the electrical socket or outlet to receive AC power from the power source 210. The plurality of LEDs included in the system 200 may range from 20 to 150 LEDs. In addition, the LEDs may be white LEDs, red LEDs, green LEDs, blue LEDs, or any color of LEDs. The power supply module 220 may receive AC power from the power source 210. In one example, the AC power may be in the range of 108 volts to 132 volts. Alternatively, the AC power may be approximately 220 volts. In addition, the AC power may have a frequency in the range of 50-60 hertz (Hz).

The power supply module 220 may provide power to the plurality of LEDs using the AC power received from the power source 210. The power supply module 220 may include a plurality of circuit elements including, but not limited to, a bridge rectifier 222, a capacitor 224, a varistor 226, a microprocessor 228, a triode for alternating current (TRIAC) 230, and/or an ambient light sensor 232. The plurality of circuit elements may operate in combination in order to produce a voltage that is suitable to power the plurality of LEDs using the AC power.

In addition, the plurality of circuit elements included in the power supply module 220 (e.g., the bridge rectifier 222, the capacitor 224, the varistor 226, the microprocessor 228, the TRIAC 230, and/or the light sensor 232) and the plurality of LEDs may be on a single printed circuit board (PCB) within the light bulb assembly 270. In one example, the power supply module 220 may include more than one bridge rectifier 222 and capacitor 224. For example, a first bridge rectifier and capacitor may power a first set of 50 LEDs and a second bridge rectifier and capacitor may power a second set of 50 LEDs. In addition, the plurality of LEDs may be arranged in series (as opposed to being arranged in parallel) on the PCB. The PCB may include a copper foil to act as a heat sink, thereby reducing the heat generated by the electrical components in the light bulb assembly 270. Alternatively, the PCB may include a foil composed of other heat dissipating materials, such as aluminum alloy or a composite material. Because the LEDs are arranged in series and the number of LEDs used in the circuit may drop or consume substantially the entire voltage received as input to the circuit, the LEDs may avoid using one or more resistors to limit the amount of voltage coming into the group of LEDs as seen in many existing LED circuit designs.

In one example, the bridge rectifier 222 may receive the AC power from the power source 210. The bridge rectifier 222 may perform full wave rectification with the AC power in order to produce a direct current (DC) voltage. The bridge rectifier 222 may include four or more diodes in a bridge circuit configuration. In one example, the bridge rectifier 222 may be used with the capacitor 224 to convert 120 volts of AC power to 120 volts of DC power. The capacitor 224 may smooth the voltage from the bridge rectifier 222. In one example, the capacitor 224 may be a reservoir capacitor that smoothes the voltage by releasing stored energy during portions of an AC waveform when the power source 210 does not supply AC power to the power supply module 220.

In one example, a total voltage drop associated with the plurality of LEDs may be substantially equal to the voltage from the power source 210. Alternatively, the total voltage drop associated with the LEDs may be substantially equal to the voltage output from the bridge rectifier 222. In general, the term "voltage drop" may refer to a reduction of voltage as current passes through the load elements (i.e., elements that do not supply voltage) in an electrical circuit. In one example, the voltage may drop approximately 1-6 volts when moving through each LED. As another example, the voltage drop per LED may be approximately 2.2 volts. If the power source 210 provides 120 volts, then the light bulb assembly 270 may include approximately 50 LEDs (i.e., 50×2.2 volts equals 120 volts). As another example, the power source 210 may provide 220 volts and each LED may have a voltage drop of 2.2 volts. Thus, 100 LEDs may be used in the light bulb assembly 270 (i.e., 100×2.2 volts equals 220 volts). In other words, the number of LEDs included in the light bulb assembly 270 may be selected by substantially balancing the voltage from the power source 210 (or the voltage outputted by the bridge rectifier 222) with a total voltage drop associated with the plurality of LEDs to consume the voltage entirely using the LEDs to generate light. For example, the 220 volts from the power source 210 may be substantially balanced with the total voltage drop of 220 volts. Since the LEDs are arranged in series within the light bulb assembly 270, the total voltage drop associated with the plurality of LEDs may be calculated by adding the voltage drop of each LED.

In addition, the number of LEDs included in the light bulb assembly 270 may be selected based on a desired amount of lumens for the LEDs. In general, the term "lumen" may be a measure of the total amount of visible light emitted from an LED bulb. For example, the LED bulb may be desired to produce 800 lumens in order to match a luminosity level associated with a 60 W incandescent light bulb. Each LED included in the LED bulb may produce 16 lumens and have a voltage drop of 2.2 volts. Thus, the LED bulb may contain 50 LEDs when receiving 120 volts from the power source 210. As another example, the LED bulb may be desired to produce 450 lumens in order to match a luminosity level associated with a 40 W incandescent light bulb. Each LED included in the LED bulb may produce 11.25 lumens and have a voltage drop of 3 volts. Thus, the LED bulb may contain 40 LEDs when receiving 120 volts from the power source 210.

As yet another example, the LED bulb may be desired to produce 1600 lumens in order to match a luminosity level associated with a 100 W incandescent light bulb. Each LED included in the LED bulb may produce 39 lumens and have a voltage drop of approximately 3 volts. Thus, the LED bulb may contain 40 LEDs when receiving 120 volts from the power source 210. In addition, each LED may consume 100 milliamps (mA) of amperage.

In one example, the number of LEDs included in the light bulb assembly may be expressed by the equation: $N_{LED}=V_{INPUT}/V_{LED}$ (1) wherein $N_{LED}$ represents the number of LEDs in the light bulb assembly, $V_{INPUT}$ represents the amount of voltage being received at the light bulb assembly, and $V_{LED}$ represents the voltage drop per LED in the light bulb assembly.

In addition, the number of LEDs (i.e., $N_{LED}$) in the light bulb assembly may be used to determine a desired number of lumens for the light bulb assembly using the equation: $L=N_{LED} \times L_{LED}$ (2), wherein L represents the total amount of lumens produced by the light bulb assembly, $N_{LED}$ represents the number of LEDs in the light bulb assembly, and $L_{LED}$ represents the number of lumens produced by each LED. Alternatively, variations and combinations of equations (1) and (2) may be used to determine $N_{LED}$, L, $V_{INPUT}$, $V_{LED}$ and/or $L_{LED}$ based on known parameters or restrictions (e.g., 120 volts of input voltage). For instance, the number LEDs used may be selected based on a combination of the total desired amount of lumens and a total voltage drop.

The number of lumens produced by the LED bulb per each watt of power consumed by the LED bulb may be maximized by: (1) arranging the LEDs in series within the light bulb assembly 270; (2) selecting LEDs with desired characteristics (e.g., a desired voltage drop and a desired amount of lumens); and (3) balancing the voltage drop of each of the LEDs with the voltage from the power source 210. Therefore, the LED bulb may produce a number of lumens matching that of a 60 W incandescent light bulb (e.g., 800 lumens). However, in contrast to an incandescent bulb, the LED bulb may consume approximately 7.7 watts of power, whereas the 60 W incandescent light bulb uses 60 watts of power to produce the same number of lumens. As another example, the LED bulb may produce a number or lumens matching that of a 40 W incandescent light bulb (e.g., 450 lumens). However, the LED bulb may consume approximately 5 watts of power, whereas the 40 W incandescent light bulb uses 40 watts of power to produce the same number of lumens. As yet another example, the LED bulb may produce a number of lumens matching that of a 100 W incandescent light bulb (e.g., 1600 lumens). However, the LED bulb may consume approximately 17 watts of power, whereas the 100 W incandescent light bulb uses 100 watts of power to produce the same number of lumens. Therefore, the LED bulb may utilize a very high percentage of the voltage received from the power source 210, thereby maximizing the amount of light produced by the LED bulb. In addition, the amount of heat produced within the light bulb assembly 270 can be minimized using this technology so that the LED bulb does not require a heat sink.

In one configuration, the varistor 226 (or voltage dependent resistor) may be positioned in series with the bridge rectifier 222 in order to protect the LEDs from overcurrent or excess current. In other words, the varistor 226 may act as a fuse in order to prevent the LEDs burning out from excess current. In an alternative configuration, the varistor 226 may be positioned in parallel with the bridge rectifier 222 in order to protect the LEDs from overcurrent or excess current. In yet another configuration, the LEDs may be protected from excess current using a transient suppressor or a current limiter that is positioned in series or in parallel with the bridge rectifier 222. In one example, the varistor 226 may be a metal-oxide varistor.

In one example, the microprocessor 228 may control the TRIAC 230 in order to dim the LEDs, and the TRIAC 230 may be in series with the bridge rectifier 222. The TRIAC 230 may conduct current in either direction when triggered (i.e., turned on). When the TRIAC 230 is triggered, a portion of the AC waveform may be effectively removed, thereby reducing the amount of power provided to the LEDs. The reduction of power to the LEDs may result in the LEDs dimming (i.e., producing less light). The microprocessor 228 may trigger the TRIAC 230 in order to reduce the amount of power being provided to the LEDs. When the microprocessor 228 stops triggering the TRIAC 230, the LED bulb may brighten because the LED bulb may revert to receiving a defined amount of power resulting in a defined luminosity level (e.g., 800 lumens).

The microprocessor 228 may include a data store (not shown in FIG. 2). The term "data store" may refer to any device or combination of devices capable of storing, accessing, organizing, and/or retrieving data. The data store may include volatile or non-volatile read-only memory (ROM), erasable programmable read only memory (EPROM), electrically erasable programmable read-only memory (EEPROM), or flash memory. In one example, the data store may include one or more predefined lighting configurations to save energy and/or money. For example, the LED bulb may be capable of producing approximately 800 lumens (corresponding to a 60 W incandescent light bulb). However, a predefined lighting configuration may dictate that the LED bulb produce approximately 450 lumens (corresponding to a 40 W incandescent light bulb) in order to save energy and money. Thus, the predefined lighting configuration stored in the data store may define various parameters that the microprocessor 228 can use when triggering the TRIAC 230 in order to reduce the amount of power being provided to the LEDs.

In one example, the microprocessor 228 may adjust a number of lumens produced by the LEDs based on an amount of light detected by the ambient light sensor 232. The ambient light sensor 232 may measure the amount of light (in lumens) surrounding the LED bulb. For example, the ambient light sensor 232 in the LED bulb may detect approximately 300 lumens surrounding the LED bulb (e.g., the light may be coming into the room from a window). Thus, the microprocessor 228 may trigger the TRIAC 230 in order to reduce the amount of power being provided to the LEDs. The microprocessor 228 may reduce the number of lumens produced by the LED bulb by 300 lumens after taking into account the light received from the window.

In one configuration, the microprocessor 228 may use the TRIAC 230 to increase or decrease the amount of power being provided to the LEDs when the amount of light detected by the ambient light sensor 232 changes. For example, the microprocessor 228 may decrease the amount of power being provided to the LEDs (in order to decrease the amount of light produced by the LED bulb) when the ambient light sensor 232 detects an increased amount of light. Alternatively, the microprocessor 228 may increase the amount of power being provided to the LEDs (in order to increase the amount of light produced by the LED bulb) when the ambient light sensor 232 detects a decreased amount of light. Therefore, the amount of light in the room may be at a constant level, even when the light coming into the room through the window changes during the day.

Figure 3:
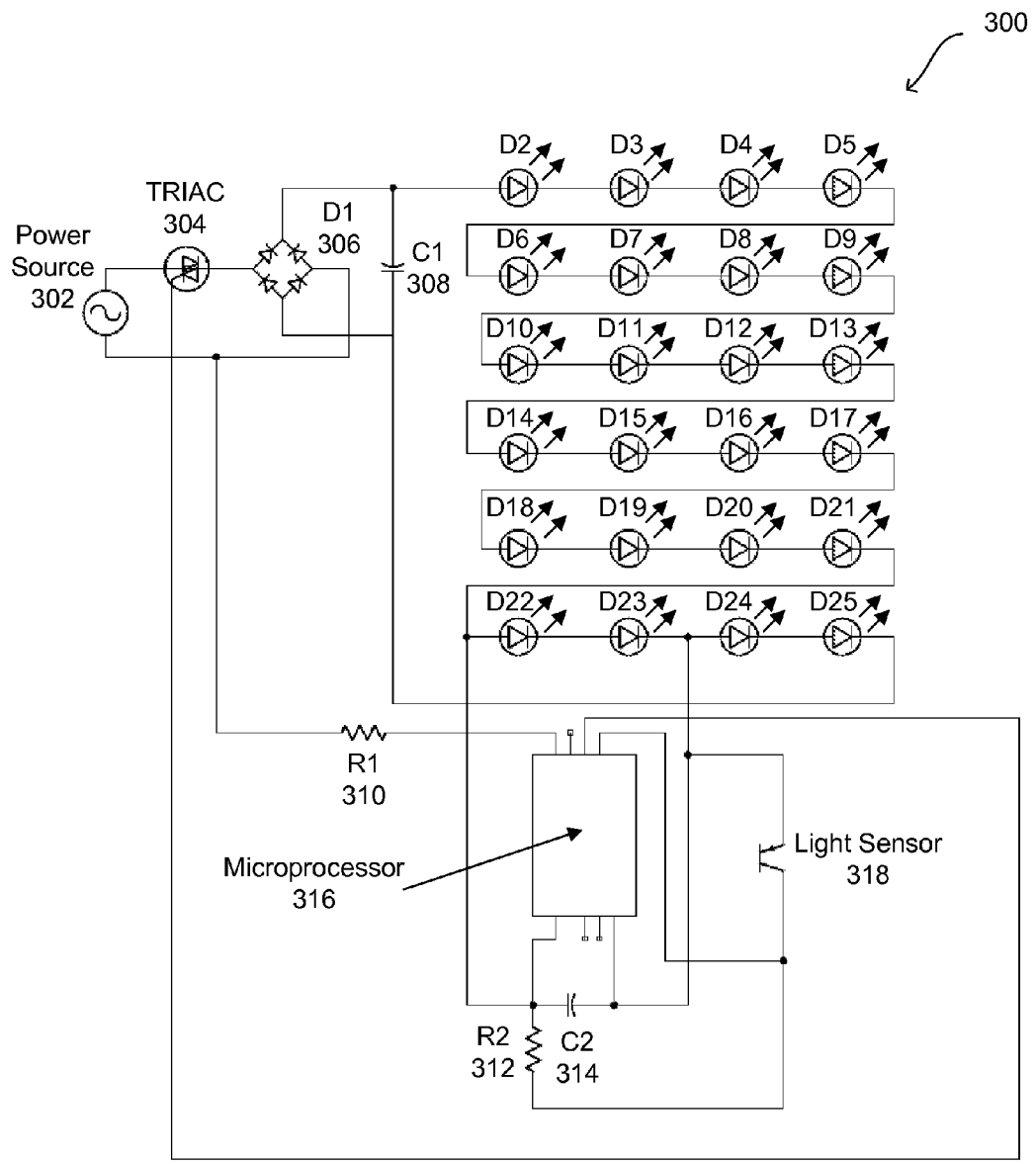
FIG. 3 is a circuit diagram for powering a light emitting diode (LED) bulb using an alternating current (AC) power source according to an example of the present technology.

FIG. 3 is a circuit diagram 300 for powering a light emitting diode (LED) bulb using an alternating current (AC) power source. The circuit diagram 300 may include a power source 302, a TRIAC 304, a bridge rectifier (D1) 306, a first capacitor (C1) 308, a first resistor (R1) 310, a second resistor (R2) 312, a second capacitor (C2) 314, a microprocessor 316, an ambient light sensor 318, and a plurality of LEDs (D2 to D25) arranged in series.

The power source 302 may provide AC power (e.g., 120 volts). The bridge rectifier 306 may perform full wave rectification of the AC power. The first capacitor 308 may smooth a voltage from the bridge rectifier 306. The total voltage drop associated with each of the LEDs may be substantially balanced with the voltage from the bridge rectifier 306. In addition, the microprocessor 316 may dim the plurality of LEDs using the TRIAC 304 in series with the bridge rectifier 306. As previously discussed, the microprocessor 316 may use the TRIAC 304 to reduce the amount of power being provided to the LEDs. The reduction in power may result in the LEDs being dimmed. In another example, the microprocessor 316 may adjust the number of lumens produced by the plurality of LEDs using the TRIAC 304 based on an amount of light detected by the ambient light sensor 318.

The first resistor (R1) 310 may reduce the amount of voltage being provided to the microprocessor 316. The microprocessor 316 may be configured to function at approximately 2-5 volts. Therefore, the first resistor (R1) 310 may reduce the voltage being received from the power source 302 (e.g., 120 volts) to approximately 2-5 volts. In one example, the first resistor (R1) 310 may be a 5.1 megaohm (MΩ) resistor. The second resistor (R2) 312 may adjust a sensitivity level associated with the light sensor 318. For example, the light sensor 318 may be very sensitive when the second resistor (R2) 312 is a 10 k ohm resistor, whereas the light sensor 318 may be less sensitive when the second resistor (R2) 312 is a 1 k ohm resistor. The second capacitor (C2) 314 may smooth the voltage being received at the microprocessor 316. In addition, the second capacitor (C2) 314 may provide power to the microprocessor 316 during time periods when the TRIAC 304 restricts power from being provided to the microprocessor 316. In other words, the second capacitor (C2) 314 may function as a backup storage for the microprocessor 316 when the microprocessor 316 does not receive power from the power source 302.

Figure 4:
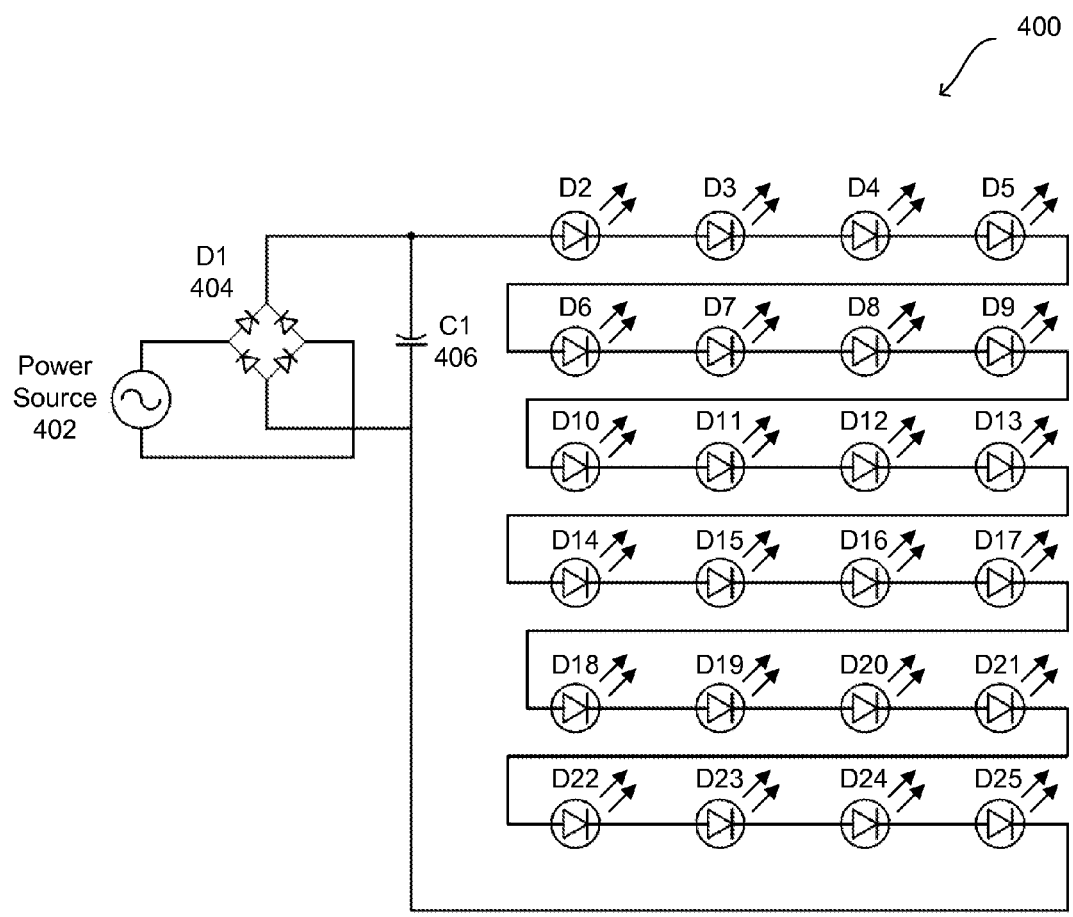
FIG. 4 is a circuit diagram for powering a light emitting diode (LED) bulb using an alternating current (AC) power source and microprocessor according to an example of the present technology.

FIG. 4 is an alternative circuit diagram 400 for powering a light emitting diode (LED) bulb using an alternating current (AC) power source. The circuit diagram 400 may include a power source 402, a bridge rectifier (D1) 404, a capacitor (C1) 406, and a plurality of LEDs (D2 to D25) arranged in series. The power source 402 may provide AC power (e.g., 120 volts). The bridge rectifier 404 may perform full wave rectification of the AC power. The capacitor 406 may smooth a voltage from the bridge rectifier 404. As previously discussed, the total voltage drop associated with the LEDs may be substantially balanced with the voltage from the bridge rectifier 404 in order to minimize the heat output generated when producing a given amount of lumens.

Figure 5A:
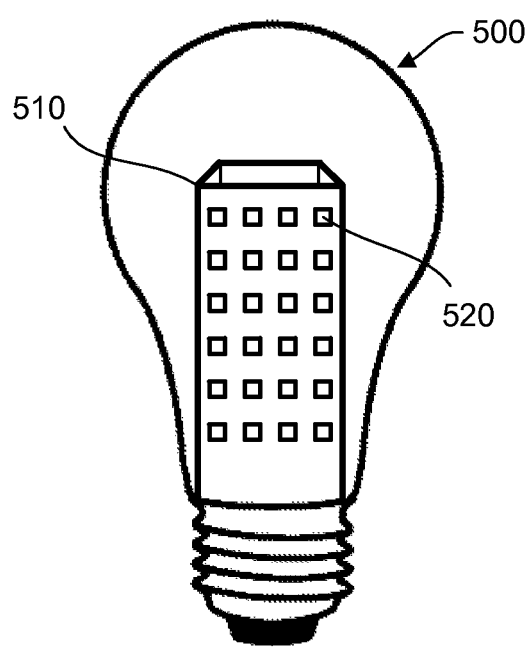
FIGS. 5A and 5B are illustrations of light emitting diode (LED) bulbs containing a plurality of panels with LEDs according to an example of the present technology.
Figure 5B:
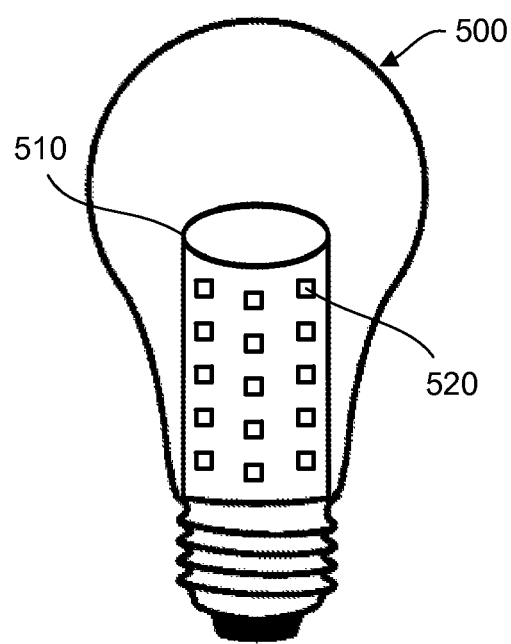

FIGS. 5A and 5B are exemplary illustrations of light emitting diode (LED) bulbs 500 containing one or more panels 510. The one or more panels 510 may be arranged to form a geometric shape within the LED bulb 500, such as a cuboid (as shown in FIG. 5A) or a cylinder (as shown in FIG. 5B). Alternatively, the one or more panels 510 may be arranged to form other geometric shapes within the LED bulb 500, such as a cuboid, cube, pyramid, cone, sphere, etc. The one or more panels 510 may each include a plurality of LEDs 520. The LEDs may be arranged in a two-dimensional array on each of the panels. The panels 510 may be inside a light bulb housing. The LED bulb 500 may be capable of fitting into a light bulb socket and may use a defined light bulb form factor such as A-19. In addition, each of the panels 510 that are arranged to form the geometric shape may contain a two-dimensional array of LEDs. In the example shown in FIG. 5A, the LED bulb 500 may contain four panels each with a two-dimensional array of 25 LEDs. Thus, the LED bulb 500 may contain a total of 100 LEDs.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the technology. One skilled in the relevant art will recognize, however, that the technology can be practiced without one or more of the specific details, or with other methods, components, materials, etc. In other instances, well-known structures, materials, or operations are not shown or described in detail to avoid obscuring aspects of the technology.

While the foregoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A light bulb assembly, comprising:
    a bridge rectifier to perform full wave rectification of an alternating current (AC) power source;
    a capacitor to smooth a voltage from the bridge rectifier;
    a plurality of light emitting diodes (LEDs) arranged in series, wherein a number of LEDs included in the light bulb assembly is selected by substantially balancing the voltage from the AC power source with a predefined voltage drop associated with each of the LEDs to consume the voltage using the LEDs to generate light; and
    a microprocessor to dim the plurality of LEDs using a triode for alternating current (TRIAC) in series with the bridge rectifier.

2. The light bulb assembly of claim 1, further comprising a varistor in series with the bridge rectifier to protect the plurality of LEDs from excess current.

3. The light bulb assembly of claim 1, wherein the predefined voltage drop associated with each of the LEDs is approximately 1-6 volts per LED.

4. The light bulb assembly of claim 1, wherein the plurality of LEDs generate a defined amount of lumens substantially matching a luminosity level associated with a 40 watt (W), 60 W or 100 W incandescent light bulb.

5. The light bulb assembly of claim 1, wherein the light bulb assembly complies with a defined light bulb form factor and is configured to fit into an electrical socket.

6. The light bulb assembly of claim 1, wherein the LEDs are arranged on a cylindrical panel within the light bulb assembly.

7. The light bulb assembly of claim 1, wherein the LEDs are included on two or more panels that are arranged to form a geometric shape within the light bulb assembly.

8. The light bulb assembly of claim 7, wherein the LEDs are arranged in a two-dimensional array on each of the panels within the light bulb assembly.

9. The light bulb assembly of claim 1, wherein the voltage drop associated with approximately 50 LEDs is substantially balanced with approximately 120 volts provided by the AC power source.

10. The light bulb assembly of claim 1, wherein the number of LEDs includes 50-150 LEDs.

11. The light bulb assembly of claim 1, wherein the bridge rectifier, capacitor, and LEDs are on a single printed circuit board (PCB).

12. A system for providing power using an alternating current (AC) power source in order to power light emitting diodes (LEDs), comprising:
    a plurality of light emitting diodes (LEDs) arranged in series;
    a bridge rectifier located in proximity to the LEDs to perform full wave rectification of an alternating current (AC) power source;
    a capacitor to smooth a voltage from the AC power source;
    a microprocessor to dim the plurality of LEDs, wherein the microprocessor dims the plurality of LEDs using a triode for alternating current (TRIAC) that is in series with the bridge rectifier; and
    wherein a total voltage drop associated with the plurality of LEDs arranged in series is substantially equal to the voltage from the AC power source.

13. The system of claim 12, wherein the microprocessor is further configured to adjust a number of lumens produced by the plurality of LEDs using the triode for alternating current (TRIAC) based on an amount of light detected by an ambient light sensor.

14. The system of claim 12, wherein the system for providing power using the AC power source is included in a light bulb apparatus.

15. The system of claim 12, wherein the bridge rectifier and capacitor for providing power using the AC power source are included in a light bulb apparatus.

16. The system of claim 12, wherein the bridge rectifier, the capacitor, the plurality of LEDs, a varistor, the microprocessor, the TRIAC, and an ambient light sensor are on a single printed circuit board (PCB).

17. A light bulb assembly, comprising:
- a bridge rectifier to perform full wave rectification of an alternating current (AC) power source;
- a capacitor to smooth a voltage from the bridge rectifier;
- a plurality of light emitting diodes (LEDs) arranged in series, wherein a number of LEDs included in the light bulb assembly is selected by substantially balancing the voltage from the AC power source with a predefined voltage drop associated with each of the LEDs to consume the voltage using the LEDs to generate light; and
- a microprocessor to dim the plurality of LEDs using a triode for alternating current (TRIAC) in series with the bridge rectifier and to adjust a number of lumens produced by the plurality of LEDs using the TRIAC based on an amount of light detected by an ambient light sensor.

* * * * *